US010185331B2

(12) United States Patent
Cheng et al.

(10) Patent No.: US 10,185,331 B2
(45) Date of Patent: Jan. 22, 2019

(54) MODULAR COMPUTER AND THERMAL MANAGEMENT

(71) Applicant: ICE Computer, Inc., Saratoga, CA (US)

(72) Inventors: Shang-Che Cheng, Saratoga, CA (US); Wei-Han Wu, New Taipei (TW); Chia-Ming Lin, Taipei (TW)

(73) Assignee: ICE COMPUTER, INC., Saratoga, CA (US)

( * ) Notice: Subject to any disclaimer, the term of this patent is extended or adjusted under 35 U.S.C. 154(b) by 841 days.

(21) Appl. No.: 14/199,834

(22) Filed: Mar. 6, 2014

(65) Prior Publication Data

US 2014/0257591 A1    Sep. 11, 2014

Related U.S. Application Data

(60) Provisional application No. 61/776,682, filed on Mar. 11, 2013.

(51) Int. Cl.
| | |
|---|---|
| *G05D 7/06* | (2006.01) |
| *G06F 1/20* | (2006.01) |
| *G06F 1/32* | (2006.01) |

(52) U.S. Cl.
CPC .......... *G05D 7/0676* (2013.01); *G06F 1/20* (2013.01); *G06F 1/3293* (2013.01); *G06F 2200/1635* (2013.01); *Y02D 10/122* (2018.01)

(58) Field of Classification Search
CPC ....... G05D 7/0676; G06F 1/3293; G06F 1/20; G06F 2200/1635; Y02B 60/121

(Continued)

(56) References Cited

U.S. PATENT DOCUMENTS

| 3,953,837 A * | 4/1976 | Cheek, Jr. ............ G11C 27/04 365/183 |
| 5,689,654 A * | 11/1997 | Kikinis ................ G06F 1/1626 345/173 |

(Continued)

FOREIGN PATENT DOCUMENTS

CN    200810133366.0  A1    2/2009

OTHER PUBLICATIONS

International Search Report and Written Opinion for PCT/US14/23699, dated Jul. 29, 2014, pp. 39.

(Continued)

*Primary Examiner* — Thomas C Lee
*Assistant Examiner* — Tri T Nguyen
(74) *Attorney, Agent, or Firm* — Edward C. Kwok; VLP Law Group, LLP

(57) ABSTRACT

An enclosure design facilitates heat dissipation from a space-limited computer core device. An external computer platform is provided to connect the computer core device, the external computer platform including a fan that provides an air flow to the connected computer core device. The computer core device and the computing platform may be tightly connected by connectors located on their respective enclosure walls. Both the computer core device and the external computing platform are provided air inlets and outlets on their respective enclosures. When connected, an air inlet of the computer core device faces an air outlet of the external computing platform such that a single cooling air flow flows through the external computing platform and the computer core device. The external computing platform may include a built-in fan to blow air into or draw air from the matching air inlets and outlets.

38 Claims, 7 Drawing Sheets

(58) Field of Classification Search
USPC .................. 700/300; 361/679.41; 455/556.2
See application file for complete search history.

(56) References Cited

U.S. PATENT DOCUMENTS

| | | | | |
|---|---|---|---|---|
| 6,392,925 | B2* | 5/2002 | Jha | G11C 11/15 |
| | | | | 257/E27.005 |
| 6,424,369 | B1* | 7/2002 | Adair | A61B 1/00016 |
| | | | | 257/E25.032 |
| 6,563,703 | B2 | 5/2003 | Xie | |
| 7,589,962 | B1 | 9/2009 | Bhatia | |
| 8,280,465 | B2* | 10/2012 | Dorogusker | H01R 31/005 |
| | | | | 455/41.1 |
| 8,386,763 | B1 | 2/2013 | Spangler et al. | |
| 9,226,427 | B2* | 12/2015 | Liu | H05K 7/20145 |
| 2002/0065052 | A1 | 5/2002 | Pande et al. | |
| 2003/0181168 | A1* | 9/2003 | Herrod | G06F 1/1626 |
| | | | | 455/90.3 |
| 2005/0250449 | A1* | 11/2005 | Janik | G06F 1/1632 |
| | | | | 455/41.3 |
| 2006/0068842 | A1* | 3/2006 | Sanguino | H04M 1/6066 |
| | | | | 455/556.2 |
| 2008/0014482 | A1* | 1/2008 | Yamamiya | H01M 8/04007 |
| | | | | 429/421 |
| 2008/0165116 | A1* | 7/2008 | Herz | G09G 3/3406 |
| | | | | 345/102 |
| 2008/0192428 | A1 | 8/2008 | Clayton et al. | |
| 2010/0171465 | A1* | 7/2010 | Seal | G03G 15/5004 |
| | | | | 320/114 |
| 2011/0009164 | A1* | 1/2011 | Amiri | G06F 1/1615 |
| | | | | 455/556.2 |
| 2012/0011293 | A1* | 1/2012 | Cheng | G06F 1/1632 |
| | | | | 710/303 |
| 2012/0166521 | A1 | 6/2012 | Roper et al. | |
| 2012/0208501 | A1* | 8/2012 | Tsuda | H04M 1/67 |
| | | | | 455/411 |
| 2012/0208619 | A1* | 8/2012 | Canterbury | G06F 21/572 |
| | | | | 463/25 |
| 2012/0236495 | A1 | 9/2012 | Mongia | |
| 2012/0282914 | A1 | 11/2012 | Alexander | |
| 2013/0013904 | A1* | 1/2013 | Tran | G06F 9/24 |
| | | | | 713/2 |
| 2013/0054863 | A1 | 2/2013 | Imes et al. | |
| 2013/0223012 | A1* | 8/2013 | Pierides | B23P 15/26 |
| | | | | 361/704 |
| 2013/0332641 | A1* | 12/2013 | Selkirk | G06F 13/4081 |
| | | | | 710/304 |
| 2015/0189593 | A1* | 7/2015 | Xue | H04W 52/24 |
| | | | | 370/311 |

OTHER PUBLICATIONS

PCT Notification Concerning Transmittal of International Preliminary Report on Patentability for PCT/US2014/023699, dated Sep. 24, 2015, 11 pages.

\* cited by examiner

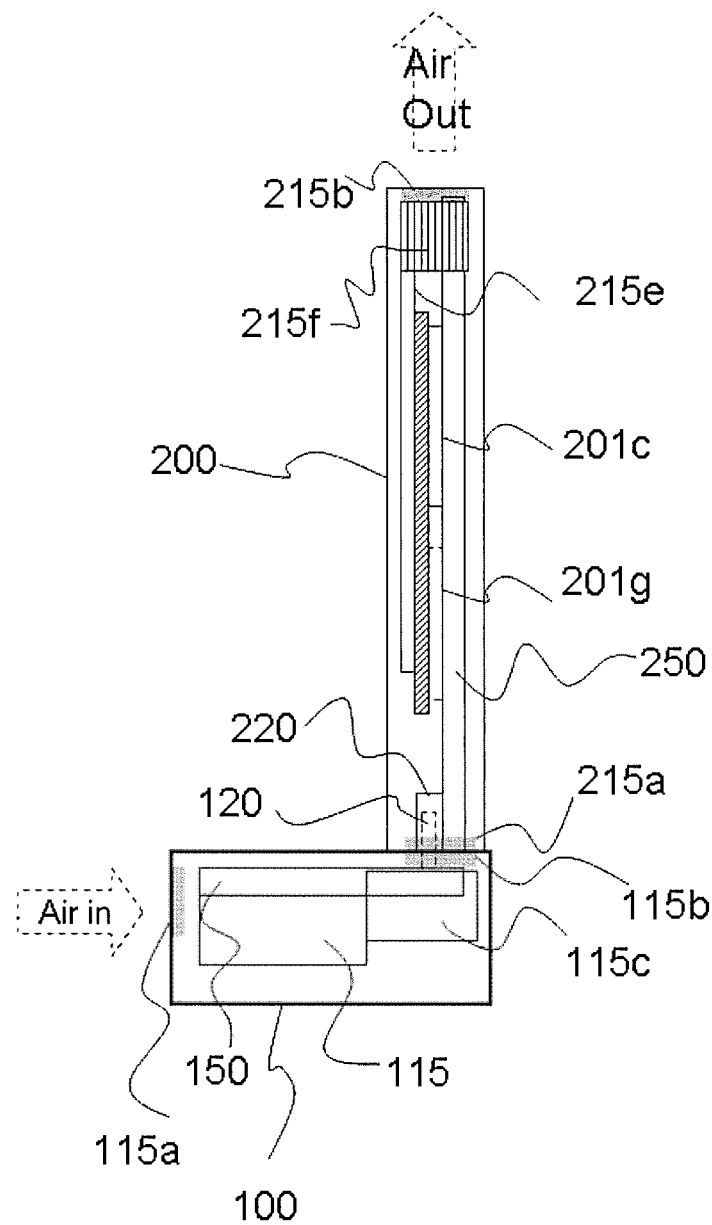

MODULAR COMPUTER AND THERMAL MANAGEMENT

CROSS REFERENCE TO RELATED APPLICATIONS

The present application is related to and claims priority of U.S. provisional patent application ("Provisional application"), Ser. No. 61/776,682, entitled "Modular Computer and Thermal Management", filed on Mar. 11, 2013. The disclosure of the Provisional application is hereby incorporated by reference in its entirety.

BACKGROUND OF THE INVENTION

1. Field of the Invention

The present invention relates to applications of modular computer cores. More particularly, the present invention relates to the use of a hybrid circuit including a high-power processor and a low-power processor to provide a selectable "thermal design power" (TDP) in a thermal module together with an air-flow design.

2. Discussion of the Related Art

In recent years, small and thin computing devices are highly favored. Some examples of small and thin computing devices include the iPad and the iPhone from Apple Computer, Inc., the "ultrabooks" notebook computers from Intel Corporation and its partners, and the ultra-thin "Android smartphones" from Google, Inc. and its partners. To support these "ultra" devices, microprocessor manufacturers have provided low-power microprocessors (e.g., the ARM microprocessors, or fan-less x86 microprocessors). These microprocessors—which dissipate less than 3 W TDP (i.e., 3 watts of "Thermal Design Power")—are primarily targeted for basic applications. To execute more advanced applications, higher power microprocessors are needed. But microprocessors that have a TDP that is higher than 3 watts require a proper thermal module for heat dissipation. In addition, the size of a typical ultra-computing device (i.e., roughly, the size of a smartphone) makes it difficult to squeeze a proper thermal module into the limited space. Other constraints on such a device include: (i) the device as a whole has to be as light as possible; (ii) the form factor has to be handheld size; (iii) noise has to be kept to a minimum, so as to be non-intrusive on the user carrying it very closely to the body (e.g., in a shirt pocket); and (iv) the exterior case temperature has to be kept low enough to be handheld permissible. Therefore, a new thermal module that is able to dissipate heat of a high-power microprocessor within the limited space of an ultra-computing device is desired to support advanced applications.

Metal blocks have been used as heat sinks that are mounted on low-power fan-less microprocessors to dissipate heat. It is also common to use metal chassis or cases to serve as passive heat sinks for low-power microprocessors. However, to transfer heat away from a higher power microprocessor, a much larger and more complete thermal module is required. Such a thermal module may include a heat dissipation plate, a heat pipe, and a heat sink. Further, it is customary also to include an integrated fan to increase airflow over the heat sink to expel the heated air out of the chassis or case quickly.

Excluding the display and the touch panel, the body of a typical ultra-thin device is less than one centimeter thick. A bulky heat dissipation block does not fit in this thickness. In addition, it is impossible to put a conventional cooling fan within the confines of the smartphone-size computer. It is a challenge to computer supplies to find a design that cools down a smartphone size computer in which a high-power microprocessor is used. In an attempt to provide such a solution, some computer thermal management companies (e.g., SUNON in Taiwan) designed powerful "mighty mini-fans" that fit into the limited space. However, these new "mini" products do not generate enough airflow to cool a high-power microprocessor in an effective manner.

SUMMARY OF THE INVENTION

In accordance with one embodiment of the present invention, a design for an ultra-thin (or smartphone-size) modular computer ("computer core") is created to dissipate heat from a high-power microprocessor without requiring a tightly integrated centrifugal fan. In that design, the fan is placed in an external computing platform ("computing device") that is separated from the computer core. In one embodiment, the computer core and the computing device are provided separate enclosures. The computer core and the computing device may be tightly connected to form an integrated computing device by connectors residing on their respective enclosure walls. A locking mechanism to secure the connection may also be provided.

According to one embodiment of the present invention, the computer core provides the computational power for the integrated computing device, while the computing device provides the power source, and peripheral interfaces for the integrated computing device. In one embodiment, both the enclosures of the computer core and the computing device have air inlets and air outlets formed by openings in their respective walls. Each matching pair of air inlet and outlet allows an airflow to flow through both the computer core and the computing device, when they are connected. In one embodiment, the computing device has a built-in fan to blow air into or draw air from the computer core through the matched air inlet and air outlet at the connection. In one embodiment, the computer core has an optional heat dissipation plate, heat pipes, and a heat sink mounted on a microprocessor for heat dissipation. In one embodiment, the computer core may have a metal chassis or case, which serves as a passive heat sink for heat dissipation. In another embodiment, the computer core includes a hybrid circuit consisting of an ARM microprocessor and an x86 microprocessor. One of the microprocessors may be selected for executing basic or advanced applications, according to whether the availability of a cooling airflow in the integrated computing device.

The present invention provides an advantage by providing the hybrid circuit that includes a high-power microprocessor and a low-power microprocessor, so that a selectable thermal design power (TDP) is available to a user. As a result, an appropriate TDP is made available when needed.

The present invention provides an advantage by separating a fan customary in a conventional integrated thermal module. The fan in the computing device can blow air into or draw air from a space-limited computer core without requiring space in the enclosure of the computer core.

The present invention provides an advantage by allowing different fan sizes for different computing devices. The different fan sizes allow a wide range of adjustable air volumes and flows be made available.

The present invention provides an advantage by accommodating a heat sink at an end or edge of the computer core, so as to facilitate and to take advantage of the convection or "chimney" effect when the computer core is oriented vertically rather than horizontally. Air heated by the components in the integrated computing device (e.g., the microprocessor) tends to rise, thereby creating a natural air flow in a general "vertical" direction. The present invention takes advantage this effect by providing an orientation of the computer core which facilitates this air flow to enhance cooling heat dissipation means (e.g., a heat sink) and the microprocessor.

The present invention provides an advantage to accommodate a heat sink at an end or an edge of the computer core. The position increases radiation from the heat sink when the heat sink is also used as an antenna for communication.

BRIEF DESCRIPTION OF THE DRAWINGS

A complete understanding of the present invention may be obtained by reference to the accompanying drawings, when considered in conjunction with the subsequent, detailed description, in which:

FIG. 2 is a sectional view of connected computer core 200 and computing device 100, according to one embodiment of the present invention.

For purposes of clarity and brevity, like elements and components bear the same designations and numbering throughout the Figures.

DESCRIPTION OF THE PREFERRED EMBODIMENT

Figure 1:
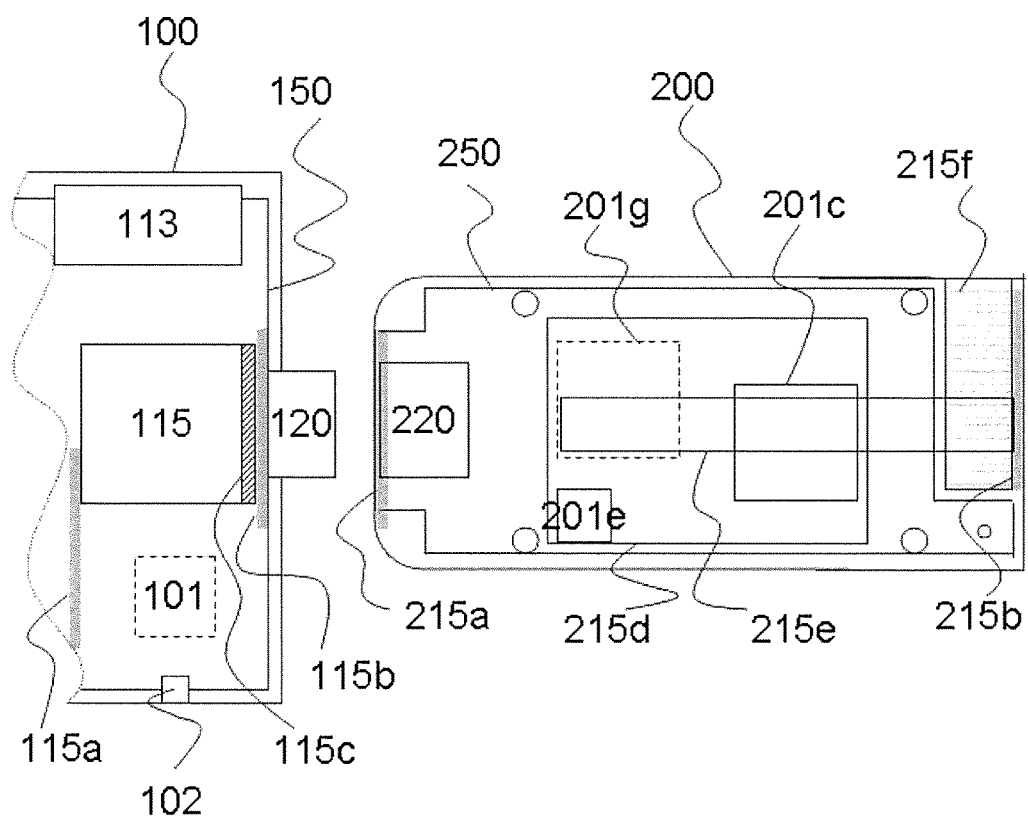
FIG. 1 is a top view of computer core 200 and a partial view of connected computing device 100.

FIG. 1 is a top view of computer core 200 and a partial view of connected computing device 100. As shown in FIG. 1, computer core 200 is smartphone size and is designed to connect to computing device 100. On base board 250, computer core 200 includes central processing unit (CPU) 201c, graphical processing unit (GPU) 201g, embedded controller 201e, and other computing components. In some embodiments, computer core 200 and computing device 100 are connected through base connector 220 and carrier connector 120 in any manner (e.g., horizontally, vertically, or with a rotation mechanism for an angle less than 270 degree). To simplify this detailed description, a component on computing device 100 is described as "carrier", while a component on computer core 200 is described as "base". The pins of these connectors are mapped functionally (e.g., USB pins, A/V pins, power pins, and data pins) to allow proper signals to flow between the computer core 200 and computing device 100. Computer core 200 and computing device 100 are designed to have a brain-and-body division of labor—i.e., when connected, computer core 200 controls the operations of computing device 100 through communication between base embedded controller 201e and carrier embedded controller 101. Computing device 100 has its own separate housing or enclosure, and includes carrier board 150, which acts as a detachable extension board for computer core 200. Carrier board 150 connects to user interfaces, such as a display, one or more touch panels, control buttons, audio interfaces, sensors, I/O connectors, and DC power supply 102 connector. In FIG. 1, these components are shown as part of I/O interfaces 113. Computing device 100 may include a battery, which serves as a backup power source for computer core 200.

According to one embodiment of the present invention, computer core 200 includes base air inlet 215a, which acts as an open port to allow air to flow into the enclosure housing computer core 200, and base air outlet 215b, which acts as an exit port. As the air flow through the disclosure between base air inlet 215a and base air outlet 215b, the air is heated by the dissipated heat from components of base board 250, such as central processing unit (CPU) 201c, graphical processing unit (GPU) 201g, and embedded controller 201e. Likewise, computing device 100 includes carrier air inlet 115a provided by the openings or slots in the walls of the enclosure, or openings in the I/O connectors. These openings allow air to enter into the enclosure of computing device 100. Computing device 100 also includes one or more carrier fans (e.g., carrier fan 115) to blow the air along air guide 115c. Air guide 115c may have a pipe-like structure to guide the air to carrier air outlet 115b. Carrier outlet 115b and base inlet 215a are positioned such that, when computing device 100 and computer core 200 are connected, air is blown from carrier outlet 115b into base air inlet 215a. Alternatively, carrier fan 115 may cause the air to flow in the opposite direction, i.e., air is drawn from computer core 200 to computing device 100, under a vacuum operation. In one embodiment, heat plate 215d is mounted on top of one or more of: GPU 201g, CPU 201c, or any other component that dissipates significant heat. Heat plate 215d transfers heat to heat pipe 215e. Heat pipe 215e terminates at heat sink 215f, which has a large surface area to allow heat dissipation into the external surrounding air with which it is in contact.

FIG. 2 is a sectional view of connected computer core 200 and computing device 100, according to one embodiment of the present invention. As shown in FIG. 2, computer core 200 is connected to computing device 100 through base connector 220 and carrier connector 120, in the manner already described with respect to FIG. 1. In this configuration, carrier air outlet 115b is abutting base air inlet 215a. Carrier fan 115 in computing device 100 draws air from the outside through carrier inlet 115a into air guide 115c. The air is then expelled through carrier air outlet 115b. As computer core 200 and computing device 100 are connected, the air expelled through carrier air outlet 115b is channeled into base air inlet 215a of computer core 200. In computer core 200, the air flows through the enclosure, over heat sink 215f and then exits through base air outlet 215b. The flowing air is heated by the heat-dissipating components along the way. In one embodiment, unlike a conventional thermal module that blows air only on a heat sink, the air flow in computer core 200 also removes heat from GPU 201g, CPU 201c, heat plate 215d, heat pipe 215e, and any other component mounted on or attached to base board 250 before reaching heat sink 215f and base air outlet 215b. In another embodiment, computer core 200 is akin to a sealed envelope, with heat sink 215f being located at the top end, so as to create a "chimney effect," which helps to drive natural ventilation and ex-filtration. These effects cool down the components faster and reduce the energy required by the fan. Likewise, air guide 115c may include walls that guide the flow of air over selected components in computing device 100. Computing device 100 may be itself a standalone device, such as a control unit having an external hard drive in data storage 160, data I/O interfaces 113, and display ports for connecting to external displays. Air guide 115c can guide the air to flow over the hard drive, and the display control unit. Such a device may have the power of a desktop computer when computer core 200 is connected.

Figure 3A:
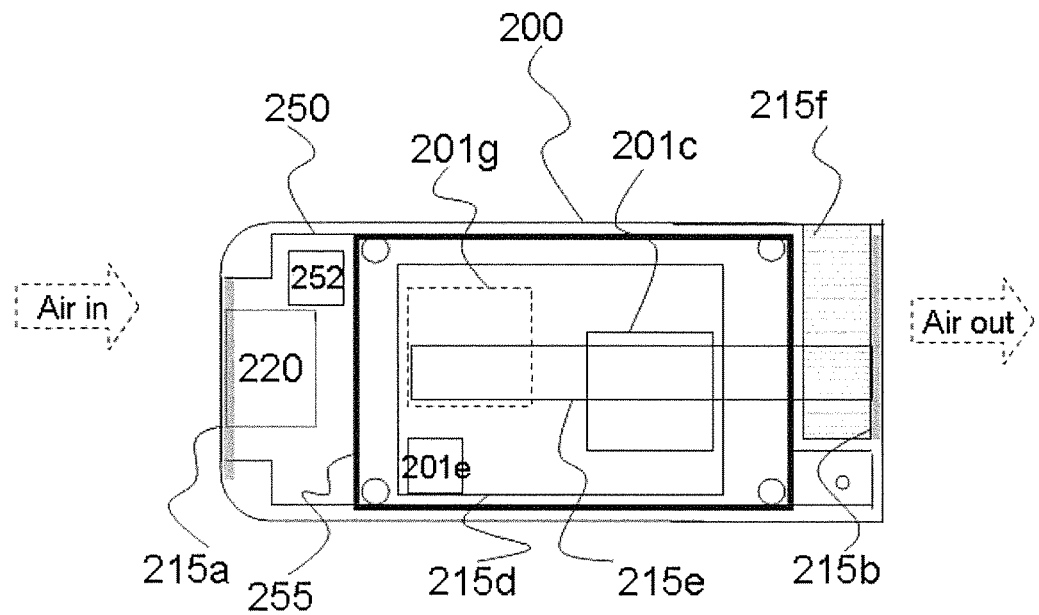
FIG. 3a which is a top view of one implementation of computer core 200 using an x86 processor and an ARM processor.

FIG. 3a which is a top view of one implementation of computer core 200 using an x86 processor and an ARM processor. As shown in FIG. 3, computer core 200 has a hybrid of an x86 processor base in computer module 255 (COM), and an ARM processor on base board 250. In one embodiment, COM module 255 is a single circuit board x86-based computer with RAM, input/output controllers and other peripheral devices. COM module 255 includes module connector 256 that is to be connected with matched module connector 256 on base board 250. Base board 250 includes an optional ARM cpu 252 microprocessor and optional components, such as RAM, a WIFI wireless device, a Bluetooth wireless device, a 3 G communication module, a camera, a USB hub controller, embedded controller 201e, and numerous sensors. These components may be integrated with base board 250 directly without going through external peripheral connectors. COM module 255 may be mounted on base board 250 through module connector 256, which may a proprietary or industrial standard COM Type connector (e.g., Type 10 connector). COM module 255 and components on base board 250 communicate with each other over the module connectors according to predefined functions defined on the connector pins. For example, if COM module connector 256 is a Type 10 connector, the optional components on base board 250 may communicate with COM module 255 through the USB pins or PCIe pins. Base board 250 may connect to carrier board 150 through base connector 220, as shown in FIG. 1.

In one embodiment, a user may select the x86-based microprocessor or the ARM microprocessor to boot computer core 200. The user's selection may be made using an interface provided by boot program. In another embodiment, computer core 200 may make the selection automatically based on detecting the availability of carrier fan 115 on connected computing device 100. For example, computer core 200 may boot by default from the x86-based microprocessor (as CPU 201c) if carrier fan 115 is detected on connected computing device 100. Otherwise, the fan-less ARM microprocessor is selected, to reduce system's energy requirement and heat dissipation. In another embodiment, a user can switch from the higher power microprocessor to the lower power microprocessor in computer core 200 at run time through an application interface that allows user selection of which processor to use for energy saving and reduced heat generation. In another embodiment, instead of being provided on base board 250, the ARM processor can be mounted on COM module with the x86-based processor. In anther embodiment, the ARM microprocessor can be integrated inside the x86-base microprocessor or chipset. Such a "hybrid" chipset (i.e., a chipset that makes available both an x86-based microprocessor and an ARM microprocessor) is available, for example, from Advanced Micro Devices, Inc. (AMD).

Figure 3B:
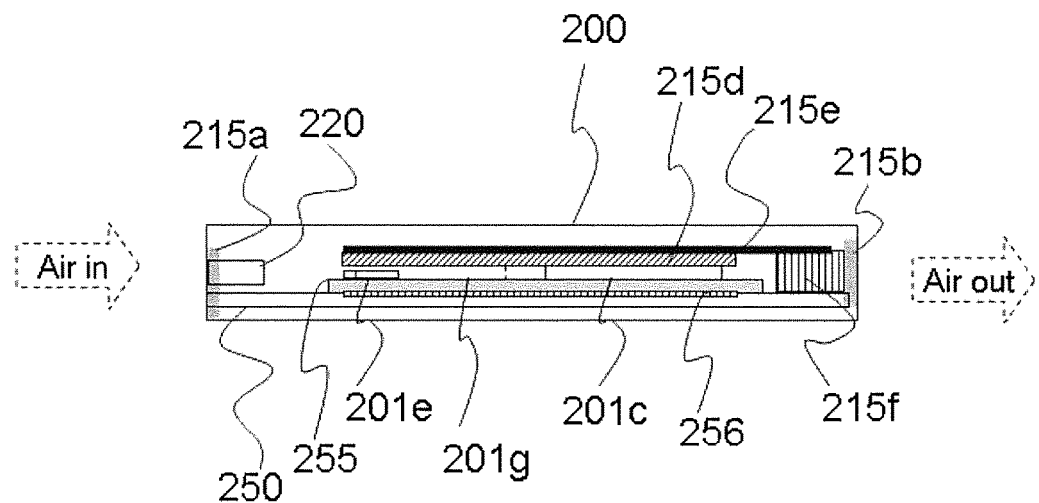
FIG. 3b is a section view of the implementation of computer core 200 of FIG. 3a along its length through connector 220.

FIG. 3b is a section view of the implementation of computer core 200 of FIG. 3a along its length through connector 220. When base board 250 is connected with carrier board 150 through base connector 220 and carrier connector 120, air can flow from base air inlet 215a to base air outlet 215b (or vice versa) according to the air flow direction of carrier fan 115 in connected computing device 100. The air flow cools heat plate 215d, heat pipe 215e, and heat sink 215f and other heat-dissipating components of computer core 200.

Figure 4:
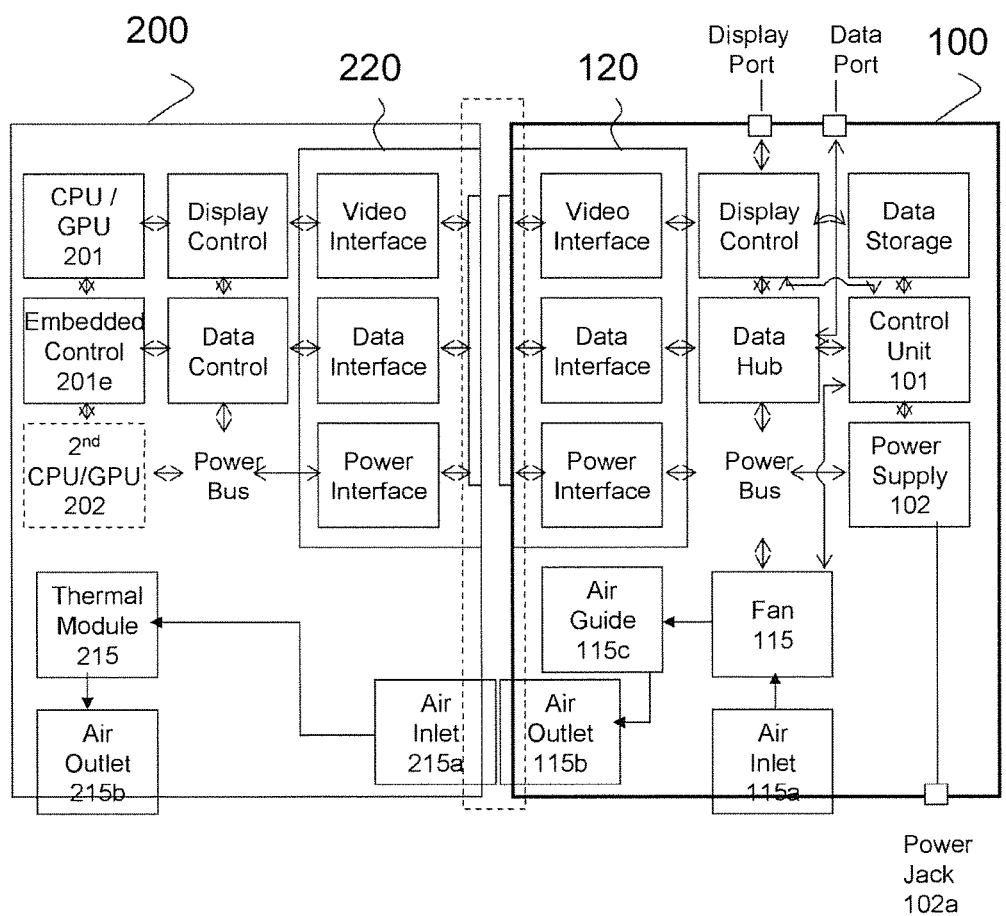
FIG. 4 is a block diagram showing one exemplary implementation of computing device 100 and computer core 200 being connected over a proprietary interface or an open interface, in accordance with one embodiment of the present invention.

FIG. 4 is a block diagram showing one exemplary implementation of computing device 100 and computer core 200 being connected over a proprietary interface or an open interface, in accordance with one embodiment of the present invention. An open interface (e.g., the Portable Digital Media Interface (PDMI)) is typically an industry interconnection standard for portable media players. In one embodiment, computing device 100 includes a control unit 101, which may be implemented by an embedded controller. Control unit 101 may carry out command execution, peripheral coordination, and information exchange with embedded controller 201e in computer core 200. As shown in FIG. 4, computing device 100 includes (a) power supply 102, which is connected to power jack 102a for supplying power to all components in computing device 100, (b) data storage 160 (e.g., a USB data storage device), (c) USB hub 161, which controls both devices and data ports, and (d) display control 162 for controlling display ports and external displays. Under the PDMI standard, for a male connector, carrier connector 120 includes pins for power interface circuit 171, data interface circuit 172 (e.g., a USB data interface), and video interface circuit 173 (e.g., HDMI). As shown in FIG. 4, computer core 200 includes (a) a power bus to distribute power to the components of computer core 200, (b) data control unit 261 (e.g., a USB data control unit), and (0 display control unit 262. For the female connector, under the PDMI standard, base connector 220 includes pins for (a) power interface circuit 271, (h) data interface circuit 272 (e.g., a USB data interface circuit), and (c) video interface circuit 273 (e.g., a Display Port video interface circuit). Computer core 200 may also implements x86-based microprocessor and chipset for CPU 201c and GPU 201g (e.g., an lintel Atom processor) with memories to run application programs. When computer core 200 and computing device 100 are connected through the PDMI connectors, power is supplied by computing device 100 to computer core 200. Computer core 200 then hoots its operating system, loads application programs and data from connected network servers, cloud servers, or data storage 160 through data control unit 262, data interface circuits 172 and 272, and data hub 161. Computer core 200 may provide video data to an external monitor connected to display port 180 through display control units 162 and 262, and display interface circuits 172 and 272. The user may interact with computing device 100 and computer core 200, using an external keyboard or a mouse (or both) connected to data port 181. The data input from the user is sent to control unit 101 through data hub 161, data interfaces 172 and 272, and data control unit 261.

For thermal management, the higher power x86-based microprocessor in computer core 200 requires a thermal module (e.g., thermal module 215) for heat dissipation. As described above, thermal module 215 includes heat plate 215d, heat pipe 215e, and heat sink 215f. In one embodiment, computer core 200 has heat plate 215*d* mounted over at least one of GPU 201*g*, CPU 201*c*, or other heat-dissipating components, and transfers the heat to heat pipe 215*e*. Heat pipe 215*e* is connected to heat sink 215*f*, which has a structure with a large surface area that is in contact with—and dissipates heat to—the surrounding air. In one embodiment, as described above, computer core 200 includes base air inlet 215*a* as an entry port to allow air to flow into its enclosure, and base air outlet 215*b* as an exit port for the heated air. As discussed above, computing device 100 includes carrier air inlet 115*a* as openings or slots in the enclosure wall or openings in the I/O connectors that allow air to enter into its enclosure, and has at least one carrier fan (e.g., carrier fan 115) to blow air into air guide 115*c*. Air guide 115*c* has a pipe like structure to convey the air into carrier air outlet 115*b*, and from there into computer core 200 through base air inlet 215*a* that has openings structurally matching those in carrier air outlet 115*b* when connected. Computer core 200 may include an optional second chipset 202 to implement CPU 201*c* and GPU 201*g*, e.g., an embedded ARM microprocessor. Typically, the low-power microprocessor does not require thermal module 215 to dissipate heat. Base on computing needs, a user may choose at any given time the x86-based chip set or the low-power chipset at boot time, or switch to the low-power CPU at turn time to reduce heat dissipation and to provide better thermal management.

Figure 5:
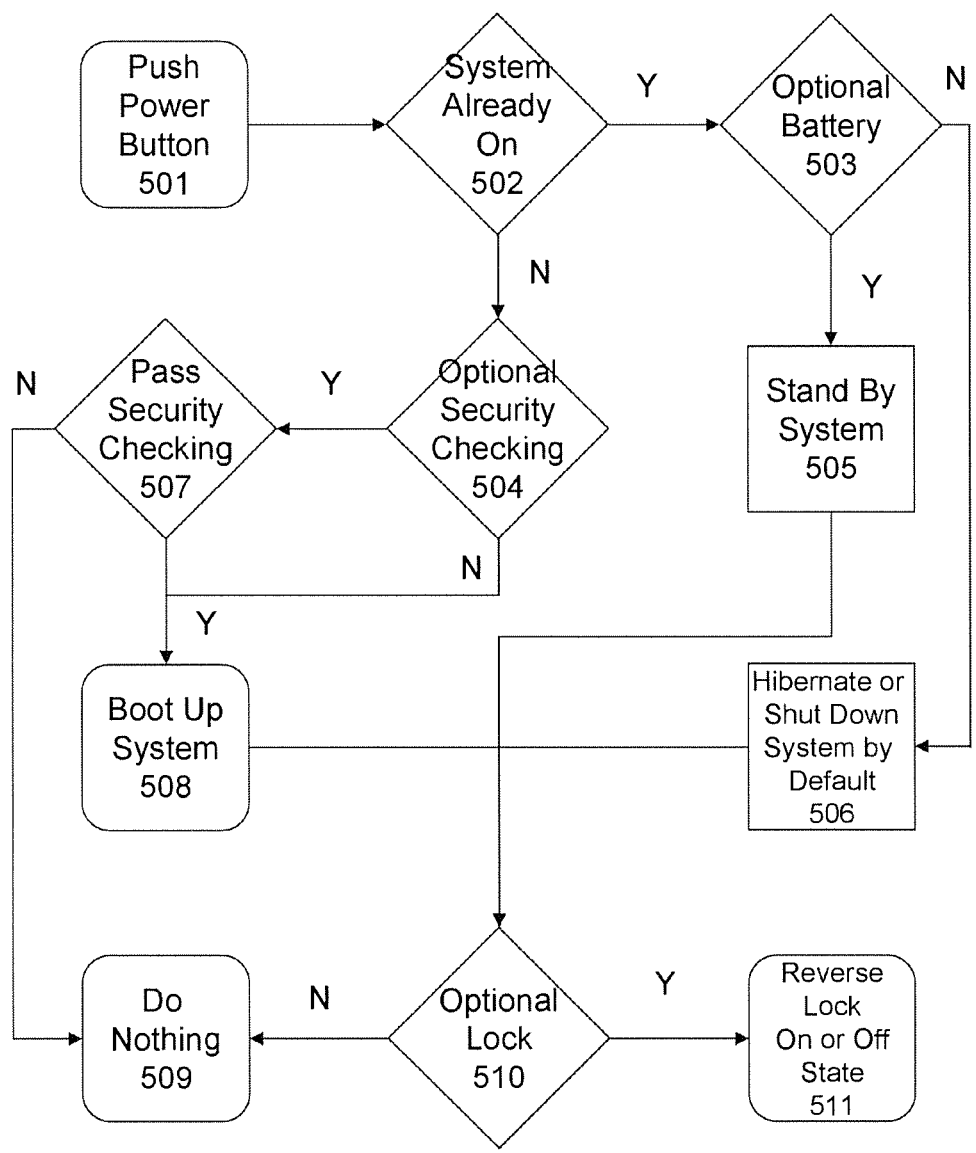
FIG. 5 shows flowchart 500, which illustrates system booting operations carried out by connected computing device 100 and computer core 200, according to one embodiment of the present invention.

FIG. 5 shows flowchart 500, which illustrates system booting operations carried out by connected computing device 100 and computer core 200, according to one embodiment of the present invention. In one embodiment, a user pushes a power button on computing device 100 (step 501), which triggers carrier embedded controller 101 to determine whether or not the system is already operating (step 502). If the system is already operating, carrier embedded controller 101 obtains from embedded controller 201*e* of computer core 200 state information regarding an optional battery (step 503). Otherwise, carrier embedded controller 101 determines if a security check is required (step 504). In one embodiment, when the optional battery is attached to the computer core 200, carrier embedded controller 101 requests embedded controller 201*e* of computer core 200 to signal the CPU 201*c* to turn into a stand-by mode (step 505). However, if the optional battery is not present, carrier embedded controller 101 requests embedded controller 201*e* of computer core 200 to signal the CPU 201*c* to a hibernate or shut-down mode, depending on a default setting (step 507). In one embodiment, when security checking is determined in step 504 to be required, carrier embedded controller 101 requests embedded controller 201*e* of computer core 200 to perform the security check (step 507). In one embodiment, security checking may involve carrier embedded controller 101 executing one or more predefined algorithms (e.g., one involving an encryption key), or verifying or validating an RFID, a finger print, or a password. If the security checking is not required, or if the security check passes, embedded controller 201*e* of computer core 200 boots up the system (step 508). If the security check fails, the system suspends (i.e., the system does not boot up; step 509).

In one embodiment, upon booting up (step 508), entering stand-by mode (step 506) or entering hibernate or shut down mode (step 506), carrier embedded controller 101 checks if a locking mechanism is available (step 510). If the locking mechanism is present, carrier embedded controller 101 requests a locking module to reverse computer core 200's locked or unlocked state (step 511). Locking tightens the physical connection between computer core 200 and computing device 100. Before the system boots up, the system is in the unlocked state. Therefore, after booting up the system, the system enters the locked state from the unlocked state. Conversely, upon entering the stand-by mode, the hibernate mode or the shut-down mode, the system also enters the unlocked state from the locked state. The locking module may include a mechanical or electric locker (e.g., a solenoid locker). If a locking mechanism is not available, the system remains in the same operation mode (step 509).

Figure 6:
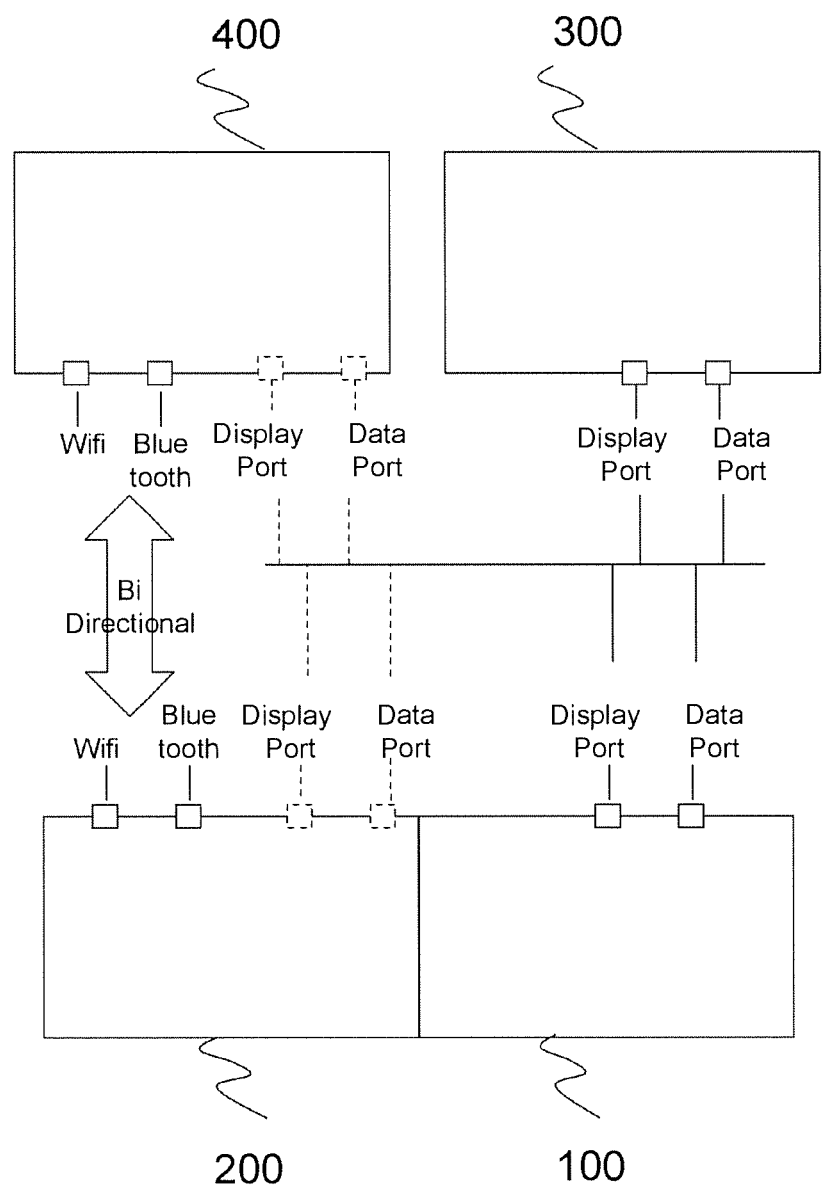
FIG. 6 is a block diagram illustrating interactions between integrated computing device 100 and computer core 200 with external devices 300 and 400, according to one embodiment of the present invention.

FIG. 6 is a block diagram illustrating interactions between integrated computing device 100 and computer core 200 with external devices 300 and 400, according to one embodiment of the present invention. In FIG. 6, computing device 100 is connected and provides power to computer core 200. Computer core 200 is wirelessly connect to external device 400 (e.g., a smartphone, a notebook computer, or an augmented reality device). The wireless connection, for example, may be used to stream content to computer core 200 from external device 400 using a WiDi, Miracast, AirPlay, or a similar protocol. Computer core 200 and external device 400 may communicate using a Bluetooth or Wifi interface, for example. In one embodiment, for example, computer core 200 may accept wireless streaming of the content from external device 400 for display on display device 300. Display device 200 (e.g., a graphical monitor or an HDTV unit) may be physically connected to computing device 100 through a display port or data port. In another embodiment, computer core 200 may accept streaming of content from external device 400 over a physical display port or data port connection between computer core 200 and external device 400 for display on display device 300. In a third embodiment, computer core 200 may accept streaming of content from external device 400 over a physical display or data port connection between computing device 100 and external device 400 for display on display device 300. In yet another embodiment, the computer core 200 may accept the streaming of content from the internet (e.g., a Youtube server) for display on display device 300, which is physically connected to computing device 100 through a display port or data port. In yet another embodiment, computer core 200 displays its local content on display device 300, which is physically connected to computing device 100 through a display port or data port.

Figure 7:
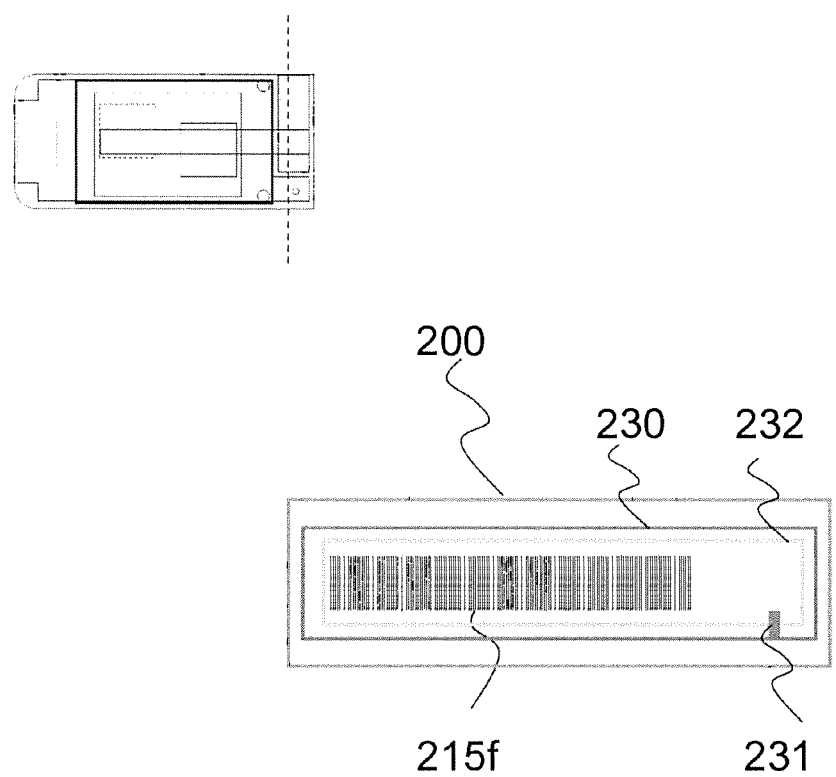
FIG. 7 is a sectional view of the chassis of computing device 100, showing an antenna being placed thereon, according to one embodiment of the present invention.

FIG. 7 is a sectional view of the chassis of computing device 100, showing an antenna being placed thereon, according to one embodiment of the present invention. According to one embodiment, an antenna cable is directly connected to heat sink 215*f* of computing device 100, so as to use heat sink 215*f* as an antenna, taking the advantage of heat sink 215*f*'s large surface area. A flexible antenna 230 (e.g., a cable antenna) may be attached for signal reception on a wall of computer device 100's chassis in the vicinity of heat sink 215*f*. For example, the flexible antenna 230 may be connected to antenna cable connector 231 on the chassis wall of computing device 100. To avoid heat sink 215*f* interfering with the incoming or outgoing signals, the flexible antenna 230 may be covered by antenna cover 232, which may be formed out of an electrically insulating material. In another embodiment, flexible antenna 230 can be placed at a location that does not overlap heat sink 215*f* or where signal reception is not blocked or shielded by heat sink 215*f*.

The above detailed description is provided to illustrate the specific embodiments of the present invention and is not intended to be limiting. Numerous variations and modifications within the scope of the invention are possible. Having thus described the invention, what is desired to be protected by Letters Patent is presented in the subsequently appended claims.

What is claimed is:

1. A modular computer configured to couple with an external computing platform, comprising:
   an enclosure having a first opening for air to enter into the enclosure provided on a first sidewall of the enclosure and a second opening for air to exit from the enclosure provided at a second sidewall of the enclosure opposite the first sidewall;
   a circuit board inside the enclosure on which is mounted one or more memory circuits and a plurality of interface circuits including a power interface circuit, a data interface circuit and a video interface circuit;
   an electrical connector provided on an outside face of the first side wall of the enclosure for carrying signals of the interface circuits, the electrical connector being mounted at one end of the circuit board and positioned for mechanically mating and electrically connecting to a matching electrical connector on the external computing platform, the external computing platform comprising a data port and a display port, for driving a display device and a data device, respectively, the electrical connector being positioned such that, when the electrical connector is coupled to the matching electrical connector on the external computing platform, the first opening of the enclosure is aligned to a corresponding opening in the external computing platform such that an air flow driven from the external computing platform is driven into the first opening of the enclosure;
   an embedded controller located within the enclosure that detects an air flow-driving device in the external computing platform;
   a control circuit mounted on the circuit board and coupled to the embedded controller, the interface circuits and the memory circuits wherein the control circuit comprises first and second processors, the first processor having a greater power requirement than the second processor, and wherein, when the modular computer is connected to the external computing platform, the control circuit selectively activates the first processor, the second processor, or both the first and the second processors, based on the embedded controller's detection of the air flow-driving device; and
   a cooling module mounted on the control circuit located between the first opening and the second opening of the enclosure such that the air flow driven from the external computing platform flows over or through the cooling module.

2. The modular computer of claim 1, wherein the one or more devices in the external computing platform comprise one or more of: a peripheral device, a sensor, a power, a thermal management unit, and a control circuit.

3. The modular computer of claim 1, wherein the enclosure is metallic and forms the cooling module.

4. The modular computer of claim 1, wherein the cooling module comprises at least one of: a metal block, a heat pad, one or more metal plates, a heat pipe, and a heat sink.

5. The modular computer of claim 4, wherein the heat sink is provided at one end of the enclosure, thereby create a chimney effect when the modular computer is disposed in a vertical position.

6. The modular computer of claim 5, wherein the chimney effect facilitates natural ventilation.

7. The modular computer of claim 1, wherein the cooling module guides the air flow inside the enclosure, the cooling module comprising one of: a mini-fan, a micro-fan, a micro-blower and a Piezoelectric Actuator.

8. The modular computer of claim 1, wherein the air flow flows over one or more of the memory circuits, the interface circuits, the embedded controller and the control circuit.

9. The modular computer of claim 1, wherein the modular computer obtains power from the computing platform through a power interface circuit or from a battery provided inside the enclosure.

10. The modular computer of claim 1, wherein the first and second processors each comprise one or more of: an x86-based microprocessor, an ARM microprocessor, a hybrid circuit including separately an x86-based microprocessor and an ARM microprocessor, or a hybrid circuit integrating an x86-based microprocessor and an ARM microprocessor.

11. The modular computer of claim 1, wherein the first and second processors comprise a central processing unit and a graphical processing unit, the circuit board further comprising a mass storage unit for storing data that support the central processing unit running application programs and the graphical processing unit playing digital videos.

12. The modular computer of claim 1, wherein the modular computer displays its content using an external display device that is connected to a display port in the external computing platform.

13. The modular computer of claim 12, wherein the modular computer comprises a display that is smaller than the external display device.

14. The modular computer of claim 1, wherein the circuit board comprises one of: a single base board and a COM Express mini-board integrated with a base board.

15. The modular computer of claim 14, wherein the base board is mounted on the COM Express mini-board.

16. The modular computer of claim 14, wherein the control circuit comprises one of: (i) a single microprocessor, (ii) a hybrid integrated circuit mounted on the base board, on which both the first and the second processors reside, or a hybrid circuit mounted on a COM Express mini-board, and (iii) a hybrid circuit including the first and second processors separately mounted on a COM Express mini-board and on the base board, respectively.

17. The modular computer of claim 16, wherein the first and second processors share system resources.

18. The modular computer of claim 17, where the system resources are accessible over a proprietary interface.

19. The modular computer of claim 17, wherein the control circuit also selectively executes from the first processor or the second processor under user selection.

20. The modular computer of claim 17, wherein the external computing platform comprises physical input or output ports and power ports accessible by the modular computer.

21. The modular computer of claim 1, wherein the embedded controller requests the control circuit of modular computer to boot up or shut down.

22. The modular computer of claim 21, wherein the embedded controller requests the control circuit of the modular computer to shut down or refrain from booting up when one or more of the following conditions are satisfied: a request by a control circuit in the external computing platform or by an embedded controller in the external computing platform, and a failure of an authentication mechanism.

23. The modular computer of claim 22, wherein the authentication mechanism comprises one of: a predefined authentication algorithm, an RFID, a finger print, a key, and a password.

24. The modular computer of claim 22 wherein upon satisfaction of one or more of the conditions, the embedded controller requests a control circuit of the external computing platform to lock the modular computer using a mechanical or electric solenoid lock.

25. The modular computer of claim 24, wherein locking of the modular computer tightens a connection between the modular computer and the external computing platform.

26. The modular computer of claim 25, wherein the embedded controller requests the control circuit of the external computing platform to unlock the mechanical or electric solenoid lock to release the modular computer, after the control circuit of the modular computer shuts down.

27. The modular computer of claim 1, wherein the modular computer displays its contents wirelessly on an external display device using one of the following protocols: WiDi, Miracast, and AirPlay.

28. The modular computer of claim 27, wherein the modular computer exchanges data wirelessly with an external wireless display device through one or more of the following protocols: Wifi, and Bluetooth.

29. The modular computer of claim 27, wherein the external display device is selected from the group consisting of: a display panel, an image projection device, and a group of one or more display units of any display type.

30. The modular computer of claim 1, wherein the modular computer bi-directionally accepts and displays content from an external computing device on an external display device, the external display device being connected to a display port of the external computing platform.

31. The modular computer of claim 30, wherein the modular computing platform is connected to the external computing device through a wireless connection or physical connector on the external computing platform.

32. The modular computer of claim 1, wherein the cooling module comprises a heat sink serving also as an antenna for the modular computer.

33. The modular computer of claim 1, wherein the cooling module comprises a heat sink, and wherein the modular computer further comprises a flexible antenna located in a vicinity of the heat sink.

34. The module computer of claim 33, wherein the flexible antenna is partially or fully surrounded or covered the heat sink.

35. The module computer of claim 33, wherein the heat sink includes fins that are oriented to serve as a reflector for signal reflection onto the flexible antenna.

36. The module computer of claim 1, wherein the cooling module comprises a heat sink and wherein the modular computer further comprises a flexible antenna located such that the heat sink does not block signals to be received into the modular computer.

37. The modular computer of claim 1, wherein the first and second processors are provided in a hybrid circuit including separately an x86-based microprocessor and an ARM microprocessor, or a hybrid circuit integrating an x86-based microprocessor and an ARM microprocessor.

38. The modular computer of claim 1, wherein the control circuit sends video signals and data signals over the electrical connector to the display port and the data port to drive the display device and the data device, respectively.

* * * * *